United States Patent Office 2,855,384
Patented Oct. 7, 1958

2,855,384

PROCESS FOR PRODUCING LINEAR POLYUREAS

Wolfgang Lehmann and Heinrich Rinke, Leverkusen-Bayerwerk, Leverkusen, Germany, assignors to Farbenfabriken Bayer Aktiengesellschaft, Leverkuson, Germany, a corporation of Germany No Drawing. Application May 20, 1955, Serial No. 510,027. In Germany November 2, 1949

Public Law 619, August 23, 1954
Patent expires November 2, 1969

8 Claims. (Cl. 260—77.5)

This invention relates to linear polyureas and to a novel process for producing same.

It is known to react diisocyanates with diamines to form products of high molecular weight, but the polyureas obtainable by this method do not have the properties expected of them (cf. O. Bayer, Angew. Chemie A. 59, pages 257–273 (1947)). The products are brittle, cannot be melted and give off an odour of ammonia upon being heated. It has been discovered that the diisocyanate reacts with a hydrogen atom of the urea groups formed and this causes cross-linking. In certain individual reactions for forming polyamides, it is also known to use the salts of diamines instead of the diamines themselves, for example the salts of diamines with carbonic acid.

It has now been found that high molecular weight polyureas which are not cross-linked can be obtained by reacting diisocyanates with diamine carbamates which can be obtained by reacting diamines with carbon dioxide. The polyureas thus obatined have properties which are fundamentally different from those of the formerly known resinous substances. If these products are of sufficiently high molecular weight, it is possible by heating them to produce melts from which it is possible in known manner to draw filaments which can be cold-drawn in the manner customary with polyamides.

The diisocyanates, and particularly the aliphatic polymethylene diisocyanates, which have already been proposed for the production of polyureas, are particularly suitable as starting materials in the present instance. It is alternatively possible to use compounds which split off diisocyanates under the action of heat, such as the diphenyl carbamide acid esters of diisocyanates and phenols, or the addition products of diisocyanates with hydrocyanic acid. As diamines it is possible to use those conventionally used in the production of polyamides, and especially the aliphatic polymethylene diamines. The carbamates to be used in accordance with the invention are easily obtained from the diamines by introducing carbon dioxide.

The reaction is preferably carried out in a solvent; benzene or chlorobenzene, for example, have proved to be particularly suitable for this purpose. The reactants are preferably mixed in solution with one another in the cold and heated to the boiling point of the solvent while stirring. By suitable choice of the solvent, the linear polyurea form precipitates and can be filtered off with suction. Residues of solvent can be extracted by treatment with substances which are not solvents for the polyurea.

The polyureas obtained are just as suitable for the production of filaments, fibers, bristles and films as are the known linear polyamides and polyurethanes. The stretched filaments show the high strength inherent in polyamides.

Example 1

1.02 mols of the mixture of carbamates obtained by reacting carbon dioxide with a mixture of undecane- and dodecane-diamine, was formed by hydrogenating the dinitriles of dicarboxylic acids obtained by the oxidation of 12-hydroxystearic acid, are heated with 1 mol of hexamethylene diisocyanate and 2 litres of chlorobenzene from room temperature to boiling point over a period of 2 hours while stirring. After boiling for one hour, the mixture is allowed to cool to 100° C. and the polyurea which is formed is filtered off as a snow-white powder. In order to remove the adhering solvent, the polyurea is washed with methanol. The polyurea dissolves very readily in m-cresol and has a viscosity number ($Z\eta$) therein of 73. $Z\eta = \eta_{sp/c}$ is defined in Chemical Abstracts, volume 36, page 17 (1942), and by Schulz et al. in J. prakt. Chem. 158, 130–5 (1941). The melting point is 210 to 212° C. (in a sulphuric acid bath). The polyurea can be melted very satisfactorily in an atmosphere of carbon dioxide at temperatures of 230–250° C. After all the gas bubbles have escaped from the melt, which is the case about 1½ hours after the melting point has been reached, the melt can easily be spun in known manner to form filaments or threads which can be cold-stretched 3½ to 4 times. The tensile strength of such threads is then 4.4 g./den. with a breaking elongation of 20%.

Example 2

Carbon dioxide is introduced at room temperature into a solution of 1 mol of hexamethylene diamine in 2 litres of benzene until 1 mol of carbon dioxide has been absorbed. The diamine carbamate formed then precipitates. A solution of 1 mol of hexamethylene diisocyanate in 500 cc. of benzene is then added and the mixture heated for 2 hours at boiling point while stirring. The mixture is thereafter cooled to 60° C. and the polyurea formed is filtered off. It is possible to draw threads from a melt formed from this polyurea by contact with a glass rod; these threads can easily be cold-stretched ($Z\eta = 247$), M. P. 293–295° C.

Example 3

1 mol of the diaminocarbamate disclosed in Example 1 and 1 mol of a substance which splits off phenol (the urethane from 2 mols of phenol and 1 mol of hexamethylene diisocyanate) are added to 2 liters of chlorobenzene and the mixture heated gradually to boiling point while stirring. The solution, which is clear at a low temperature, becomes cloudy when the polyurea is deposited; this polyurea is filtered off with suction one hour later and thereafter extracted with methanol ($Z\eta = 111$), M. P. 210–212° C.

Example 4

1.01 mols of the diaminocarbamate disclosed in Example 1, 1 mol of dodecamethylene diisocyanate and 2 litres of chlorobenzene are heated to boiling point over a period of 3 hours while stirring. The diaminocarbamate slowly dissolves. After a time, the polyurea gradually precipitates. 2 hours after boiling commences, the mixture is slowly cooled to 80° C. and the highly polymerised urea filtered off with suction ($Z\eta = 55$), M. P. 178–182° C.

Example 5

1.02 mols of the diaminocarbamate disclosed in Example 1 and 1 mol of tetramethylene diisocyanate are heated to boiling point with 3 litres of chlorobenzene over a period of 1½ hours. The precipitate is filtered with suction after half an hour and washed with methanol ($Z\eta = 59.6$), M. P. 232–235° C.

Example 6

Carbon dioxide is introduced at 20° C. into a solution of 1.02 mols of octamethylenediamine in 3 litres of benzene. A solution of 1 mol of octamethylene diisocyanate in 1 litre of benzene is then added dropwise at room temperature over a period of half an hour while stirring. The carbamate, which is suspended in jelly form, enters into solution with the diisocyanate. When this solution is heated, about 1 mol of carbon dioxide is quickly split off at temperatures between 70 and 80° C. with formation of the insoluble polyurea. After boiling the suspension for 1 hour, the polyurea is filtered off with suction while hot and dried in vacuo. It is possible for threads to be drawn from the colourless melt of the polyurea (M. P. 240–242° C.). These threads can be stretched satisfactorily while cold. The viscosity number of the polymer is $Z\eta=110$.

The term "diamine carbamate salt" as used in the appended claims means the reaction product of a diamine with carbon dioxide as obtainable by introducing carbon dioxide into the diamine at room temperature.

What is claimed is:

1. A method for making a linear polyurea which comprises reacting in substantially equal molecular proportions a diamine carbamate salt and an alkylene diisocyanate at a temperature of at least about 70° C., the only groups of said diisocyanate reactive with said salt being isocyanate groups.

2. A method for making a linear polyurea which comprises reacting in substantially equal molecular proportions a diamine carbamate salt and an alkylene diisocyanate at a temperature of at least about 70° C. in an inert organic solvent therefor, the only groups of said diisocyanate reactive with said salt being isocyanate groups.

3. The process of claim 1 wherein the diamine carbamate salt is a mixture of undecane and dodecane diamine carbamate salts.

4. The process of claim 1 wherein the diisocyanate is hexamethylene diisocyanate.

5. The process of claim 1 wherein the diamine carbamate salt is hexamethylene diamine carbamate salt.

6. The process of claim 1 wherein the diisocyanate is dodecamethylene diisocyanate.

7. The process of claim 1 wherein the diisocyanate is tetramethylene diisocyanate.

8. The process of claim 1 wherein octamethylene diamine carbamate salt is reacted with octamethylene diisocyanate.

References Cited in the file of this patent

UNITED STATES PATENTS 2,292,443     Hanford _____ Aug. 11, 1942

FOREIGN PATENTS 838,217     Germany _____ May 5, 1952

OTHER REFERENCES

Schulz et al.: "Chemical Abstracts," col. 36, page 17, 1942.

Katchalski et al.: Journ. American Chem. Soc., vol. 73, April 1951, pages 1829–1831.